United States Patent [19]

Perrin

[11] 4,037,893
[45] July 26, 1977

[54] ROLLING-CONTACT BEARINGS WITH THREADED OR GROOVED PLANET ROLLERS

[75] Inventor: Hervé Perrin, Chambery, France

[73] Assignee: La Technique Integrale, Chambery, France

[21] Appl. No.: 650,141

[22] Filed: Jan. 19, 1976

[30] Foreign Application Priority Data

Jan. 21, 1975 France .................. 75.01813

[51] Int. Cl.² ............................................. F16C 13/00
[52] U.S. Cl. ..................................... 308/205; 308/3 A
[58] Field of Search ........................ 308/205, 3 R, 3 A

[56] References Cited

U.S. PATENT DOCUMENTS

| 230,884 | 8/1880 | Biscaccianti | 308/205 |
| 2,325,099 | 7/1943 | Best | 308/205 |

Primary Examiner—Philip Goodman
Assistant Examiner—Richard A. Bertsch
Attorney, Agent, or Firm—Amster & Rothstein

[57] ABSTRACT

This rolling-contact bearing is of the type comprising an internal screw, an external nut and, therebetween, in proper engagement with said screw and nut, a plurality of threaded planet rollers held at the proper relative angular spacing by means of their trunnions engaging bores provided to this end in end rings, said rollers comprise a cylindrical central plain portion having a diameter at the most equal to the root diameter of the threads of said rollers, said plain cylindrical portion is connected through rounded fillets to the adjacent threads of the rollers. This assembly, in the case of a simple nut, affords a higher degree of rigidity with a lesser degree of losses of movement.

2 Claims, 1 Drawing Figure

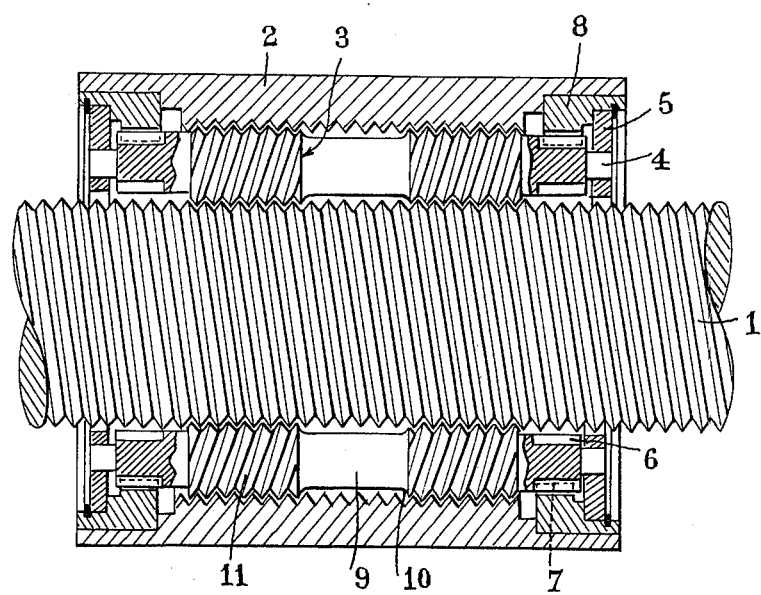

ROLLING-CONTACT BEARINGS WITH THREADED OR GROOVED PLANET ROLLERS

The present invention relates in general to roller-type rolling-contact bearings or bearing structures intended for use either as a worm-and-nut device or as a circular rolling thrust bearing, of the kind comprising essentially an inner screw-threaded worm or screw, an outer, internally screw-threaded socket and, between these two members, screw-threaded or grooved planet rollers (if grooved rollers are used, the grooves have a circular section) wherein the threads or grooves engage the threads of said socket and also those of said worm or screw, so as to operate, according to the selected kinematics, either as a worm and nut device or as a circular-rolling thrust bearing.

This invention relates more particularly:

to devices of the type wherein the roller threads have the same inclination as that of the threads of one of said two members (screw or nut) between which the planet rollers are disposed, said rollers comprising if desired toothed portions meshing with corresponding teeth of said screw and/or nut, to devices of the type wherein the grooved rollers may be disengaged from the threads of said nut and screw by virtue of a longitudinal plain portion of reduced diameter formed in the nut threads while remaining parallel to the screw axis due to the provision of a cylindrical cage or separator, and restored axially by the value of one pitch through the specific arrangement of cam means.

In devices of this kind, the following inconveniences have been observed:

a. Under load, the stresses developing in the contact areas of the screw-threads between rollers and screw, and between rollers and socket, frequently differ between two adjacent points (located theoretically on the same generatrix), which is conducive to different elastic distortions of the threads at adjacent contact points, and therefore to different contact areas, thus creating specific fatigue stress conditions for the accessory components such as teeth, cages, separators, cam means, etc. (the centres of these contact areas being located at different distances from the roller axis), as well as variations in the resultant rigidity.

b. Also under load, internal stresses develop in the roller, which are a cause of torques leading to elastic distortions having consequential effects on the resultant kinematics which becomes untrue (thus causing a loss of movement) observed more particularly when changing the direction of application of stress, and impairs the rigidity of the device under dynamic conditions.

c. In the case of an arrangement of the so-called "split" nut type, since every half-nut does not carry the same loads the points of contact of the screw-threads do not lie on the same generatrix, and as a result the slipping movements which are necessary for controlling the teeth differ from one roller end to the other, or alternatively the tendency of grooved rollers to depart from a position of strict parallelism with respect to the screw axis increases and therefore involves a detrimental corrective action from the guide cages or separators and also from the cam means (grooved satellite roller recycling screw).

The present invention relates to bearing devices of the rolling-contact type comprising planet rollers either screw-threaded or formed with circular-sectioned grooves for producing a helical or circular movement, wherein the planet rollers are arranged with a view to reduce appreciably the above-mentioned inconveniences.

To this end, this rolling-contact device comprising screw-threaded or circular-sectioned grooved planet rollers for helical or circular movement, comprising an inner screw, an outer internally-threaded socket, and, between said screw and socket, a plurality of screw-threaded or grooved planet rollers having their threads or grooves in meshing engagement with the screw threads and with the socket threads is characterized in that said rollers comprise, in a manner known per se, intermediate their screw-threaded or grooved end portions, a cylindrical central portion of smaller diameter, this diameter being at the most equal to the root diameter of the adjacent threaded or grooved portions, in that the length of said cylindrical portion corresponds to about one-third of the useful length of said rollers, and that said central portion merges through rounded fillets into the adjacent threads or grooves.

Besides, the diameter and length of this central reduced portion are selected with due consideration for the maximum permissible torques or flexion stresses likely to be produced during changes of direction or value of the efforts, notably for taking up the slips by means of teeth or when flexion stresses develop on account of the engagement with recycling cam means.

Moreover, the planet rollers are made preferably from steel stock according to the French Norms 45 SCD 6 or 35 NCD 16 treated to 52–55 HRC, machined according to standard requirements in the art and by applying the dimensional requirements prescribed for teeth and thread or groove profiles for current products of this character.

All the working surfaces of the threads or grooves and teeth may be treated according to the shot-peening technique and subsequently polished by applying a current electrolytic process for improving the resistance to wear and tear during alternate movements at a relatively high frequency and under variable loads.

If the above-defined rollers are manufactured by using 45 SCD 6 steel grade (torsion steel) with a transverse module of elasticity of about 8750 kg/sq.mm., preferably the entire roller surface will be polished.

The above-defined choices make it possible, in the case of rollers comprising "check teeth," to use without any inconveniences, as far as its wear and tear resistance is concerned, modules lower than those contemplated herinabove (for instance 0.5 mm instead of 1 mm), thus affording another possibility of improving the precision of the kinematic fidelity of the assembly.

The single FIGURE of the attached drawing illustrates diagrammatically by way of example in axial longitudinal section a typical form of embodiment of this invention.

The planet roller rolling-contact bearing device illustrated is of conventional type and comprises an internal screw 1, an external nut 2 and, therebetween, in proper engagement with both members 1 and 2, a plurality of planet, screw-threaded rollers 3 held at the proper relative angular spacing by means of trunnions 4 formed integrally with said rollers 3 and engaging corresponding bores formed for this purpose in a pair of end rings 5. The outer ends of these rollers 3 comprise outer longitudinal teeth 6 meshing with internal longitudinal teeth 7 formed in rings 8 rotatably rigid with the nut 2 to prevent any slipping of rollers 3 in relation to said nut 2.

Each roller 3 comprises a plain central portion 9 of reduced diameter corresponding to about one-third of the useful length of the roller, the diameter of this central portion being at the most equal to the root diameter of the screw-threads 11 of said roller. Furthermore, this plain central portion 9 of reduced diameter merges through rounded fillets 10 into the threads of the end portions of the roller.

The following advantages are registered when using rollers made according to the teachings of this invention:

a. under low loads, in the case of a "single" nut, a greater rigidity is obtained with a lesser amount of "loss of movement," since the stesses exerted on or in each thread become substantially equal and produce an axial elastic distortion which is substantially unchanged at any point of contact, thus ensuring a more adequate position of the roller between screw and nut and a reduction in the "work" required from the teeth and/or cages or separators for compensating the detrimental effects resulting from a skew position of the planet rollers. The torsional effects produced by the very inertia of these rollers, through the use of torsion spring steel grades, have a lesser influence on the teeth strength and on the kinematic transmission of movements to the points of contact of the threads, thus permitting of producing more reliable mechanical assemblies characterized by a higher degree of fidelity (from the standpoint of precision) in case of loads and/or movements alternating at a relatively high rate per time unit.

b. in the case of a "cut" nut, the use of steel grades such as 45 SCD 6 or 35 NCD 16 prevents an additional fatigue of the teeth by absorbing and damping out the dynamic effects due to different slips to be controlled from one end to the other end of the roller.

c. with this type of roller, in the case of thrust bearings comprising threaded rollers (with zero controlled differential pitch), it is possible to obtain a mechanical assembly of relatively reduced outer diameter having a great rigidity and a high load capacity nothwithstanding high-frequency (in direction and/or value) alternations.

On might have inferred that the loss of certain points of contact is detrimental to the rigidity and useful life of the bearing, but it may be reminded that in the devices contemplated herein their rigidity during operation and their long useful life are also ascribable to the total kinematic resultant, and also to the presence of accessory components normally not intended for transmitting power (such as gears, cages, separators, cam means, etc.) and that the screw and nut devices with screw-threaded planet rollers (of the SR type) afford relatively high rotational speeds due to their internal symmetry. The device according to this invention has an improved and more reliable rigidity while permitting higher velocities of operation or alternations in the load direction and values.

Although a specific form of embodiment of this invention has been disclosed and illustrated herein, it will readily occur to those conversant with the art that various modifications and changes may be brought thereto without departing from the basic principles of the invention as set forth in the appended claims.

What is claimed as new is:

1. A rolling-contact bearing comprising
    an inner central screw having an axis and an outer thread extending along its entire length, said thread formed with a predetermined pitch with respect to said axis;
    an outer annular nut having internal threads extending along its inner annular surface;
    a plurality of axially extending rollers spaced about the periphery of said inner screw and each providing a threaded interconnection between said inner screw and said outer nut;
    each said roller having end sections threaded to mesh with said inner screw with the threads having a predetermined root diameter and the threads in each section formed with the same pitch that is oppositely directed with respect to said predetermined pitch;
    said end sections of each said roller being connected together by a central unthreaded portion, the diameter of each said central portion being substantially equal to said root diameter and extending axially a distance equal to approximately the central third of each said roller; and
    each said central portion connected to its respective said end sections by rounded fillets.

2. A rolling-contact bearing according to claim 1 wherein spaced sections of said outer nut corresponding to the end locations of said rollers have teeth sections formed in its said annular surface, and the outer ends of each said roller have teeth formed therein corresponding to and engageable with said outer nut teeth sections.

* * * * *